(12) United States Patent
Bodmer et al.

(10) Patent No.: US 6,313,967 B1
(45) Date of Patent: Nov. 6, 2001

(54) DISK DRIVE SPINDLE AIR BEARING

(75) Inventors: James Bodmer, Longmont, CO (US); Shuo-Hao Chen, Cupertino, CA (US)

(73) Assignee: Maxtor Corporation, Boulder, CO (US)

( * ) Notice: Subject to any disclaimer, the term of this patent is extended or adjusted under 35 U.S.C. 154(b) by 0 days.

(21) Appl. No.: 09/366,185

(22) Filed: Aug. 3, 1999

(51) Int. Cl.[7] .............. G11B 17/02; F16C 17/10
(52) U.S. Cl. ........................... 360/98.07; 310/90
(58) Field of Search ............... 360/98.07, 99.08; 310/90

(56) References Cited

U.S. PATENT DOCUMENTS

| | | | |
|---|---|---|---|
| 4,200,344 | 4/1980 | Binns et al. | 308/9 |
| 4,487,514 | 12/1984 | Mori | 384/113 |
| 4,656,545 | 4/1987 | Kakuta | 360/98 |
| 4,795,275 | 1/1989 | Titcomb et al. | 384/107 |
| 4,998,033 | 3/1991 | Hisabe et al. | 310/67 R |
| 5,040,085 | 8/1991 | Elsasser et al. | 360/98.07 |
| 5,067,528 | 11/1991 | Titcomb et al. | 141/4 |
| 5,112,142 | 5/1992 | Titcomb et al. | 384/107 |
| 5,127,744 | 7/1992 | White et al. | 384/112 |
| 5,246,294 | 9/1993 | Pan | 384/119 |
| 5,283,491 | 2/1994 | Jabbar et al. | 310/90 |
| 5,488,523 | 1/1996 | Seaver et al. | 360/99.12 |
| 5,619,083 | 4/1997 | Dunfield et al. | 310/90.5 |
| 5,658,080 | 8/1997 | Ichiyama | 384/112 |
| 5,707,154 | * 1/1998 | Ichiyama | 384/107 |
| 5,710,678 | 1/1998 | Leuthold et al. | 360/99.08 |
| 5,770,906 | 6/1998 | Hazelton et al. | 310/90 |
| 5,795,072 | 8/1998 | Hwang | 384/100 |
| 5,864,443 | * 1/1999 | Elsaesser et al. | 360/99.08 |
| 5,880,545 | * 3/1999 | Takemura et al. | 310/90 |
| 5,940,246 | * 8/1999 | Khan et al. | 360/99.08 |
| 5,964,027 | * 10/1999 | Tochiyama | 29/596 |
| 5,969,448 | * 10/1999 | Liu et al. | 310/90 |
| 5,973,878 | * 10/1999 | Yoshida et al. | 360/98.07 |
| 5,977,674 | * 11/1999 | Leuthold et al. | 310/90 |
| 5,993,066 | * 11/1999 | Leuthold et al. | 384/113 |
| 6,036,369 | * 3/2000 | Ichiyama | 384/119 |
| 6,066,903 | 5/2000 | Ichiyama | 310/90 |
| 6,069,429 | 5/2000 | Yamamoto et al. | 310/90 |
| 6,069,767 | * 5/2000 | Khan et al. | 360/99.08 |
| 6,071,014 | 6/2000 | Lee et al. | 384/107 |
| 6,118,620 | * 9/2000 | Grantz et al. | 360/99.08 |
| 6,137,650 | * 10/2000 | Heine et al. | 360/98.07 |
| 6,147,424 | * 11/2000 | Gomyo et al. | 310/90 |

FOREIGN PATENT DOCUMENTS 2000-215590 * 8/2000 (JP) .

OTHER PUBLICATIONS

IBM Technical Disclosures Bulletin, vol. 29, No. 5, pp. 2233–2234 (Oct. 1986).

Chen Shi–Xin, Liu Zhe–jie, Low Teck–Seng and Zhang Qi–De, "Future High Speed Spindle and Components for Hard Disk Drives," Insight (Jan./Feb. 1999).

Yoshikazu Ichiyama, NIDEC figure from presentation given on Dec. 18, 1998.

Chris Onozuka, Mitsubish Electric, summary of features of air dynamic bearing motors.

Shixin Chen, Qide Zhang and Zhejie Liu, "Hybrid Spindle Motor Bearing Mixes Oil and Air," Data Storage, pp. 25–30 (Dec. 1998).

* cited by examiner

Primary Examiner—Jefferson Evans
(74) Attorney, Agent, or Firm—Sheridan Ross P.C.

(57) ABSTRACT

A disk drive spindle air bearing is disclosed having increased bearing stiffness, while being capable of manufacture using conventional tolerances. The invention therefore allows the construction of a disk drive spindle bearing without the need for oil or grease that may potentially contaminate the storage disks. The disclosed disk drive spindle air bearing also provides an air bearing having low acoustical noise and power consumption characteristics.

30 Claims, 4 Drawing Sheets

DISK DRIVE SPINDLE AIR BEARING

FIELD OF INVENTION

The present invention relates to air bearings, and in particular to air-bearings used in conjunction with hard disk drive spindle motors. The invention further relates to air bearings used in disk drive spindle motors having an inside-out motor design, or alternatively, an underslung motor design.

BACKGROUND OF THE INVENTION

Disk drive memory systems store digital information on magnetic disks. The information is stored in concentric tracks divided into sectors. The disks themselves are rotatably mounted on a spindle, and information is accessed by means of read/write heads mounted on pivoting arms able to move radially over the surface of the disk. This radial movement of the transducer heads allows different tracks to be accessed. Rotation of the disk allows the read/write head to access different sectors on the disk.

In operation, the disk or disks comprising the magnetic media are rotated at very high speeds by means of an electric motor generally located inside the hub that supports the individual disks. Bearings mounted inside the hub allow the hub to rotate about a fixed shaft. These bearings are typically ball bearings or fluid bearings. Bearings having a fluid lubricant are desirable for disk drive applications because of their inherently low, nonrepeatable run out and low acoustic noise. However, these bearings suffer from several shortcomings. For instance, the oil used to provide the fluid bearing has a tendency to leak and outgas. Therefore, such bearings may lead to contamination of the interior of the disk drive. Such contamination may cause a failure of the drive in the form of data errors. Bearing systems incorporating an oil lubricant also have a limited maximum rotational speed due to their large power consumption at high speeds.

Alternative designs have utilized air bearings having grooved surfaces to generate areas of increased pressure when the surfaces of the bearing move in opposition to each other. However, such designs have typically had only a unidirectional thrust mechanism, and therefore the disk drive can only be operated when the device is in certain orientations (e.g. upright), or the device cannot withstand shock in certain directions (e.g. the axial direction). Furthermore, previous designs have featured relatively small-diameter radial bearing surfaces, resulting in bearings that have inadequate stiffness. Therefore, conventional air bearing designs result in a bearing that cannot maintain the rotating components in a precise relationship to the stationary components when bearings constructed in accordance with those designs are subjected to external forces. Adequate stiffness is difficult to achieve in an air bearing because air has a viscosity that is much lower than the viscosity of oil or other conventional lubricants.

Other bearing designs have utilized pressurized gas as a lubricating fluid. Such designs require an external supply of pressurized air and so would not be suitable for a disk drive application.

Air is desirable as a bearing lubricant because its use removes concerns about leakage and outgassing. In addition, the viscosity of air does not vary with changes in temperature as much as does the viscosity of oil or other lubricants. Furthermore, air bearings provide lower acoustical noise characteristics and less non-repeatable run out than ball-bearing designs and lower power consumption due to decreased friction than oil-filled bearings. However, known designs using air as a lubricant have used extremely high rotational speeds or extremely tight internal clearances or both to increase the stiffness of the bearing in order to achieve stiffness levels that are comparable to the stiffness of oil filled bearings. A bearing that lacks stiffness will allow the rotating disks to deviate from the desired alignment when the drive is subjected to external forces. High rotational speeds and tight clearances have been necessary in conventional air bearings because the viscosity of air is approximately 1/700 that of oil. However, increased rotational speeds generally reduce the storage capacity of the disk drive because of limitations in read/write channel data rates. Also, the tight internal clearances typically employed by known air-bearing designs increase manufacturing costs tremendously.

Other air bearing designs are physically larger in size than conventional oil filled bearings, and are therefore unsuitable for small form factor drives. Also, these other designs have a relatively large number of parts, increasing manufacturing costs.

It would be desirable to provide a bearing system for a disk drive motor assembly that utilized air as the fluid medium between bearing surfaces. In addition, it would be desirable that such a device be easy to manufacture in large volumes and at low cost. Furthermore, it would be advantageous to provide a bearing having adequate stiffness, while providing enhanced performance, lowered power consumption and wear and tear, and having a longer life than conventional bearings.

SUMMARY OF THE INVENTION

The present invention relates to an air bearing apparatus for use in hard disk drive spindle motors. In particular, the invention provides an air bearing having a large surface area, to increase the stiffness of the bearing, while allowing the bearing to be manufactured with conventional oil filled bearing type tolerances. In a preferred embodiment, the air bearing is used in conjunction with an inside out underslung motor to further increase the area of the bearing. In addition, the present invention includes a method for providing a disk drive device with a bearing having air as its lubricating fluid, and providing adequate levels of stiffness while being capable of manufacture using conventional tolerances.

The device includes a computer hard disk drive having a base. Affixed to the base is a stationary shaft having an enlarged bearing portion and a spindle portion. The diameter of the bearing portion of the shaft is approximately four times greater than that of the spindle portion. Enveloping the bearing portion of the stationary shaft is a hub having an internal cylindrical bore that is concentric to the stationary shaft and adjacent to the bearing portion of that shaft. The top portion of the cylindrical bore is adjacent to the top of the bearing. Also interconnected to the hub is a thrust plate, concentric to the stationary shaft and adjacent to a bottom of the bearing. Between the cylindrical bore in the hub and the bearing portion of the stationary shaft, and between the thrust plate and the bottom of the bearing, are fluid filled gaps. In a preferred embodiment, the fluid filling these gaps is air. In a further preferred embodiment of the device, the bearing has a plurality of grooves on the top, side and bottom surfaces of the bearing. In a most preferred embodiment, the device further includes grooves on the top, side, and bottom surfaces of the bearing that are arrayed in a herring bone pattern, and that have a square or semi-circular cross section.

In a further embodiment, a disk storage drive is disclosed having a stationary shaft with a bearing portion having a length that is less than about 90% of its diameter. The device further has a hub portion defining an interior volume, and a sleeve interconnected to the hub. The sleeve is concentric to the stationary shaft and adjacent to the bearing, and has an annular top portion concentric to the stationary shaft and adjacent to a top of the bearing. An annular thrust plate is also interconnected to the hub such that it is concentric to the stationary shaft and adjacent to a bottom of the bearing. Between the sleeve and the bearing portion and between the annular thrust plate and the bearing portion are fluid filled gaps. According to this embodiment, the bearing portion of the stationary shaft substantially occupies the internal volume of the hub.

In an additional embodiment of the present invention, a motor assembly for use in a magnetic disk drive system is disclosed. The assembly features a base, a cylindrical bearing interconnected to the base, a rotatable hub disposed about and concentric to the bearing, a stator interconnected to the base and disposed radially about an axis of rotation of the hub, and magnetic means interconnected to the hub. The interior of the hub has a surface defining a cylindrical volume that is substantially filled by the bearing. An annular thrust plate is adjacent to a bottom of the bearing. In a preferred embodiment, a cylindrical sleeve member is affixed to the hub and interposed between the cylindrical volume of the hub and the bearing. In a further preferred embodiment of the invention, the motor assembly stator defines an inner diameter, and the magnetic means is disposed about and outside of that diameter. In an alternative preferred embodiment, the stator defines an outer diameter, and the magnetic means is disposed within the diameter of the stator. In a most preferred embodiment, the sleeve member is made from a ferromagnetic material.

In another embodiment, the present invention provides an air bearing motor assembly having a base, a stationary shaft affixed to the base, and a stationary annular bearing disposed about the shaft, wherein the bearing has an outer diameter that is at least about four times the diameter of the shaft. The air bearing motor further has a rotatable hub disposed about the shaft, and a sleeve affixed to the inside of the hub. The sleeve has an upper annular portion and a cylindrical side portion, with a diameter that is slightly greater than the diameter of the bearing. The bottom portion of the sleeve extends beyond a bottom portion of the hub. Interconnected to the hub is an annular thrust plate adjacent to a bottom of the sleeve. A stator is affixed to the base such that it can interact with magnetic means interconnected to the hub.

In yet another embodiment, a disk storage unit is provided having a cylindrical bearing. The cylindrical bearing has a top, a side, a bottom and a diameter. A hub having a cylindrical inner surface with a diameter that is larger than the diameter of the bearing encloses the top and side of the cylindrical bearing such that a fluid filled gap is formed. The volume defined by the cylindrical inner surface is substantially equal to a second volume defined by the bearing. Furthermore, the volume of the cylindrical inner surface of the hub is substantially equal to a volume described by an outer surface of the hub. An annular thrust plate interconnected to the hub is positioned such that a fluid filled gap is formed between the thrust plate and the bottom of the bearing. In a preferred embodiment, the volume of the cylindrical inner surface of the hub is at least about 80% of the volume described by the outer surface of the hub.

In a further embodiment of the present invention, a method is provided for supplying an air filled bearing for use in a disk drive spindle motor. The bearing is enclosed within a closely fitting surface interconnected to a rotatable hub. The volume enclosed by the hub is substantially filled by the bearing to maximize the surface area of the bearing. In a preferred embodiment, the side, top and bottom surfaces of the cylindrical bearing are provided with grooves to increase air pressure in the medial portions of the bearing when the hub is rotating about the stationary shaft.

Additional advantages of the present invention will become readily apparent from the following discussion, particularly when taken together with the accompanying drawings.

DETAILED DESCRIPTION OF THE INVENTION

In accordance with the present invention, a disk drive spindle air bearing is provided.

Figure 1:
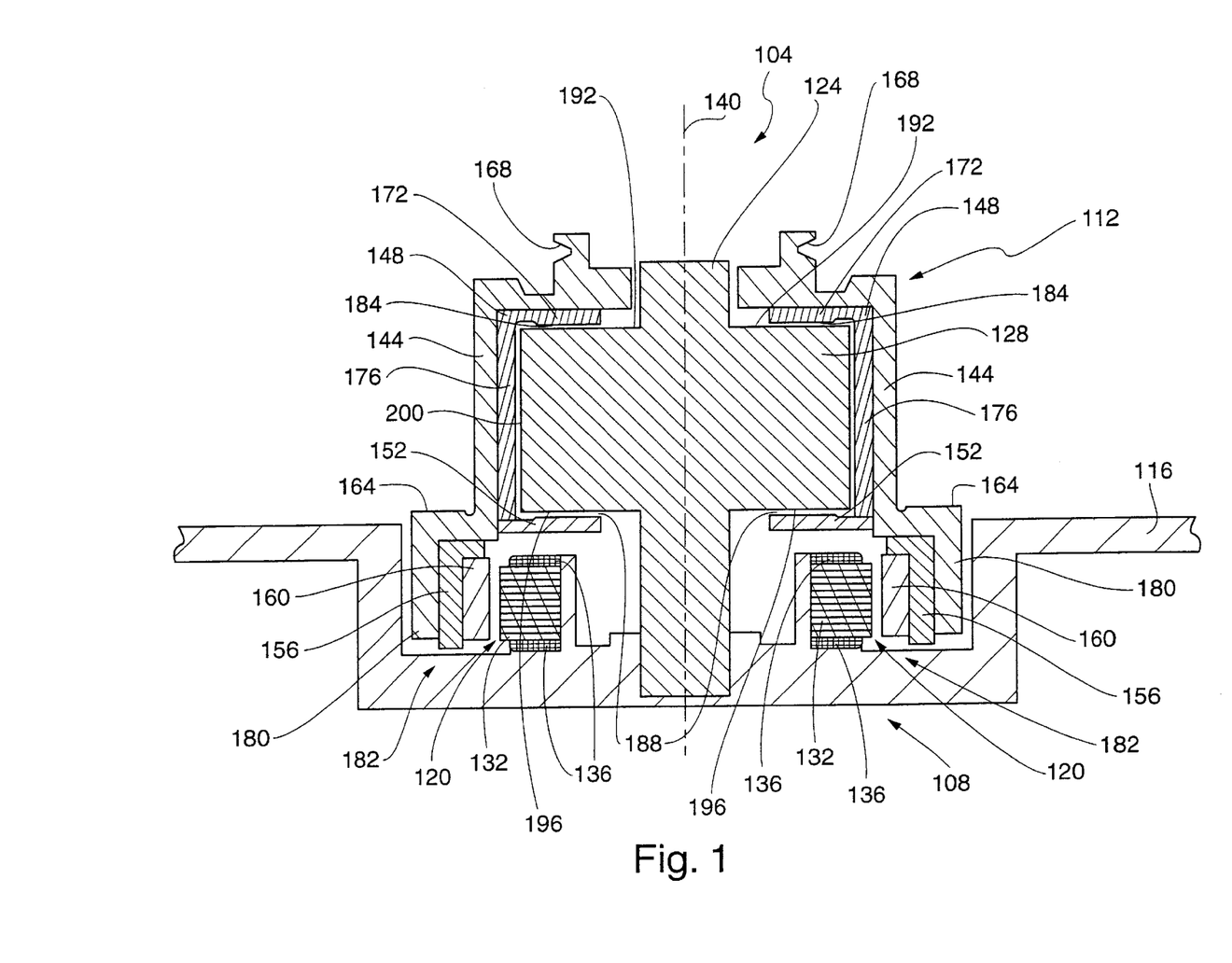
FIG. 1 is a cutaway view of a disk drive spindle air bearing having an underslung motor design in accordance with one embodiment of the present invention.

With reference to FIG. 1, an air bearing having an underslung motor design constructed in accordance with one embodiment of the present invention is generally identified as air bearing 104. The air bearing 104 generally comprises a base assembly 108 and a hub assembly 112.

The base assembly 108 generally comprises a base 116, only the center portion of which is illustrated in FIG. 1, a stator assembly 120 and a spindle 124. The spindle 124 includes an enlarged bearing portion 128. The stator assembly 120 generally comprises laminations 132 and coils 136. The laminations 132 are affixed to the base 116 and arranged radially about the longitudinal axis 140 of the spindle 124, which is itself affixed to the base 116. The coils 136 are disposed about the laminations 132. In a preferred embodiment, the base 116 comprises cast aluminum, the spindle 124 comprises machined steel, the laminations 132 comprise thin sheets of a ferromagnetic material stacked on top of one another, and the coils 136 comprise an electrically conductive wire having an insulating exterior, wound about the laminations 132.

The hub assembly 112 comprises the hub 144, sleeve 148, thrust plate 152, back iron 156, and magnets 160. The hub 144 has an internal cavity enclosing the bearing portion 128 of the spindle 124 and the stator assembly 120. The hub features a flange 164 onto which magnetic storage disks (not shown) may be stacked and supported. The hub 144 also features a clamp 168 to which a retainer (not shown) may be affixed to retain the magnetic disks (not shown). The upper portion of the internal cavity of the hub 144 defines a first cylindrical space having a length and a first diameter. Affixed to this upper portion of the cavity of the hub 144 is the sleeve 148. The interior of the sleeve 148 has an annular upper surface 172 and a cylindrical side surface 176. The exterior of the sleeve 148 is sized such that it can be securely mounted within the upper portion of the internal cavity of the hub 144, while the interior of the sleeve 148, which generally defines a cylindrical volume, has dimensions that are slightly larger than the length and diameter of the spindle bearing 128. Thrust plate 152 has an annular shape, and is adjacent to the bottom of the sleeve 148. The thrust plate 152 may be affixed to the hub 144, or to the sleeve 148.

A skirt portion 180 of the hub 144 defines a second cylindrical space in the interior of the hub 144. Affixed to the hub 144, and located within the skirt portion 180 of the hub 144 is the back iron 156. The back iron 156 is generally cylindrical in shape and is preferably made from a ferromagnetic material such as iron. Affixed to the back iron 156 are a plurality of magnets 160. The positioning of the magnets on the interior surface of the back iron 156 and within a circumference generally defined by the skirt portion 180 of the hub 144 positions them radially about the stator assembly 120.

In operation, the hub assembly 112 rotates about the longitudinal axis 140 of the spindle 124. The impetus for this rotation is provided by the motor 182, which generally comprises the stator 120, and the magnets (or rotor) 160. Energy to impart this motion is provided by an electrical current sent through the coils 136 of the stator assembly 120, which creates a magnetic field about and through the laminations 132. The interaction of this magnetic field with the magnetic field of the magnets 160 of the hub assembly 112 causes the hub assembly 112 to rotate relative to the base assembly 108.

While the hub assembly 112 is rotating relative to the base 116, resistance to forces along the longitudinal axis 140 of the spindle 124 is provided by high pressure air in the upper 184 and the lower 188 annular spaces. These areas of high pressure air are created by a laminar air flow that is created when the upper surface 172 of the sleeve 148 rotates relative to the upper annular surface 192 of the spindle bearing 128, and the thrust plate 152 rotates relative to the lower annular surface 196 of the spindle bearing 128. an Resistance to radial forces is provided by high pressure air in the cylindrical gap between the side of the spindle bearing 128 and the cylindrical side surface 176 of the sleeve 148. This high pressure air is created by a laminar air flow created when the sleeve 148 rotates relative to the spindle bearing 128.

As can be seen from the embodiment illustrated in FIG. 1, the spindle bearing 128 is relatively large, and it substantially fills the enclosed volume defined by the upper interior surfaces of the hub 144. Furthermore, the spindle bearing 128 has a volume slightly less than the enclosed volume defined by the interior surfaces located between the sleeve 148 and the thrust plate 152 on the one hand, and the spindle bearing 128 on the other hand. This large size is advantageous, because it increases the stiffness of the bearing. The relatively large size of the bearing allows it to have a stiffness that approximates the stiffness of a conventional oil bearing, even when the fluid filling the bearing is air. This is so even though the viscosity of air is approximately 1/700 the viscosity of oil. Furthermore, the disclosed design allows an air bearing having suitable stiffness characteristics to be manufactured using conventional oil-filled bearing tolerances. In addition, the disclosed design provides adequate stiffness even at conventional disk drive rotational speeds (e.g., 7200 rpm).

Figure 2:
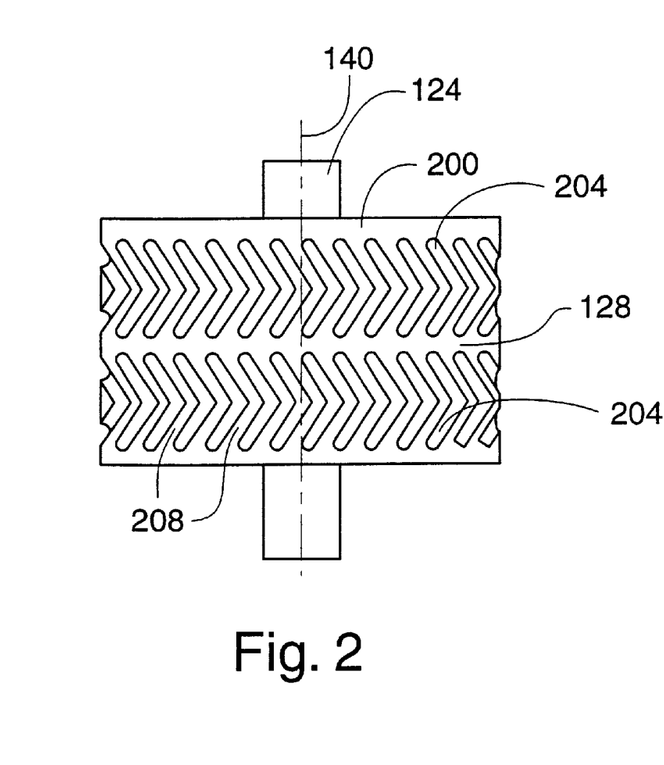
FIG. 2 is a side view of a spindle bearing having a grooved surface in accordance with one embodiment of the present invention.

In accordance with one embodiment of the present invention, the side surface 200 of the spindle bearing 128 is grooved. With reference now to FIG. 2, the radial pressure grooves 204 provided according to this embodiment generally comprise parallel rows of grooves having a herringbone shaped pattern. Preferably, the cross-section of the radial pressure grooves 204 is square, although suitable radial pressure grooves 204 can be constructed using other profiles, such as semi-circular or triangular. In a preferred embodiment, the ratio of the width of the radial pressure grooves 204 to the land 208 between the grooves is 1:1.

The radial pressure grooves 204 increase the air pressure in the annular space defined by the gap between the cylindrical side surface 176 of the sleeve 148 and the side surface 200 of the spindle bearing 128 when the hub assembly 112 rotates relative to the base assembly 108. In the illustrated embodiment, the grooves are designed so that the air pressure in the aforementioned annular space is increased when hub assembly 112 rotates about the spindle bearing 128 in the direction in which the herring-bone pattern points. Specifically, the rotation of the sleeve 148 relative to the spindle bearing 128 creates a flow of air about the spindle bearing 128 in the same direction that the sleeve 148 is rotating. The radial bearing grooves 204 tend to pull air towards the center of each row of grooves 204, thus creating areas of high pressure. Because of the increased air pressure along the center lines of each row of radial bearing grooves 204, the radial stiffness of the bearing itself is improved.

In addition to the embodiment illustrated in FIG. 2, the present invention encompasses radial bearing grooves 204 having other configurations. Thus, radial bearing grooves could be provided in any pattern generally adapted to drawing air to a center of the side surface 200 of the spindle bearing 128, so that an area of high pressure air is created. Accordingly, acceptable groove patterns include a single row a of grooves in a herring-bone shaped pattern, opposing arrays of diagonal grooves, a spiraling pattern of grooves, or varying arrangements of arcuate grooves. In addition, the present invention includes within its scope the use of vanes or other raised areas on the side surface 200 of the spindle bearing 128 to perform the same function of pumping air to an intermediate area of the side surface 200 of the spindle bearing 128 as do the grooves in the illustrated embodiment. Any pattern or arrangement of grooves or raised surfaces suitable for increasing air pressure along the side surface 200 of the spindle bearing 128 may be used. Furthermore, grooves and vanes or protrusions may be used in combination.

Although the embodiment illustrated in FIG. 2 shows grooves on the side surface 200 of the spindle bearing 128, the grooves may alternatively be provided on the interior of the side surface 176 of the sleeve 148. As described above, the function of the grooves is to create high pressure areas in a middle portion or portions of the side surface 200 of the spindle bearing 128 to increase the stiffness of the bearing in a radial direction. Therefore, the shape and pattern of provided grooves may be similar to those that would be provided on the spindle bearing 128. However, the direction of, for example, a herring-bone pattern, would be opposite that of grooves provided on the spindle bearing 128. Therefore, the herring-bone pattern would point away from the direction of rotation of the hub assembly 112 about the spindle 124 of the base assembly 108. Again, this is to draw air to an intermediate portion or portions of the side surface 176 of the sleeve 148. Furthermore, as described above, the features provided to pump air to the intermediate portions of the sleeve 148 need not be grooves, but may also be vanes or other protrusions.

Figure 3:
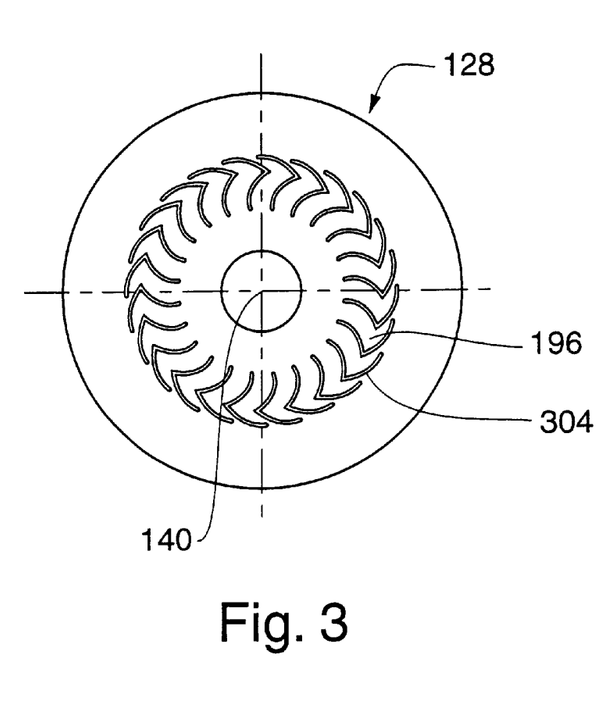
FIG. 3 is a top view of a spindle bearing having a grooved surface in accordance with one embodiment of the present invention.

Referring now to FIG. 3, the lower annular surface 196 of spindle bearing 128 according to an embodiment of the present invention is illustrated. According to the illustrated embodiment, a plurality of thrust bearing grooves 304 are provided on the lower annular surface 196 of the spindle bearing to increase the air pressure in the lower annular space 188 when the hub assembly 112 rotates relative to the base assembly 108. In the illustrated embodiment, the grooves are designed so that the air pressure in the lower 188 annular space is increased when the hub assembly 112 rotates about the spindle bearing 128 in the direction in which the herring-bone pattern points. In a preferred embodiment, similar grooves are also provided on the upper annular surface 192 of the spindle bearing 128.

The grooves 304 described above may be substituted by vanes or other raised areas on the upper 192 and lower 196 annular surfaces of the spindle bearing 128. As with grooves, the purpose of any such vanes or protrusions is to pump air to an intermediate or inner circumference of the upper 192 and lower 196 annular surfaces of the spindle bearing 128, thereby increasing the stiffness of the air bearing 104 in a direction along the longitudinal axis 140 of the spindle 124.

In an alternative embodiment, the grooves illustrated in FIG. 3 may be provided on the upper annular surface 172 of the sleeve 148, adjacent to the upper annular surface 192 of the spindle bearing 128, and on the surface of the thrust plate 152 that is adjacent to the lower annular surface 196 of the spindle bearing 128. Suitable groove designs are similar to those used when the grooves are provided on the upper 192 and lower 196 annular surfaces of the spindle bearing 128, however, the direction of such grooves would be reversed. Therefore, for example, when a herring-bone pattern is used, the herring-bone elements will point in a direction opposite that of the rotation of the sleeve 148 with respect to the spindle bearing 128 of the base assembly 108. Also, the grooves may be replaced by vanes or protrusions which serve the purpose of pumping air to an intermediate circumference of the upper 184 and lower 188 annular spaces.

Figure 4:
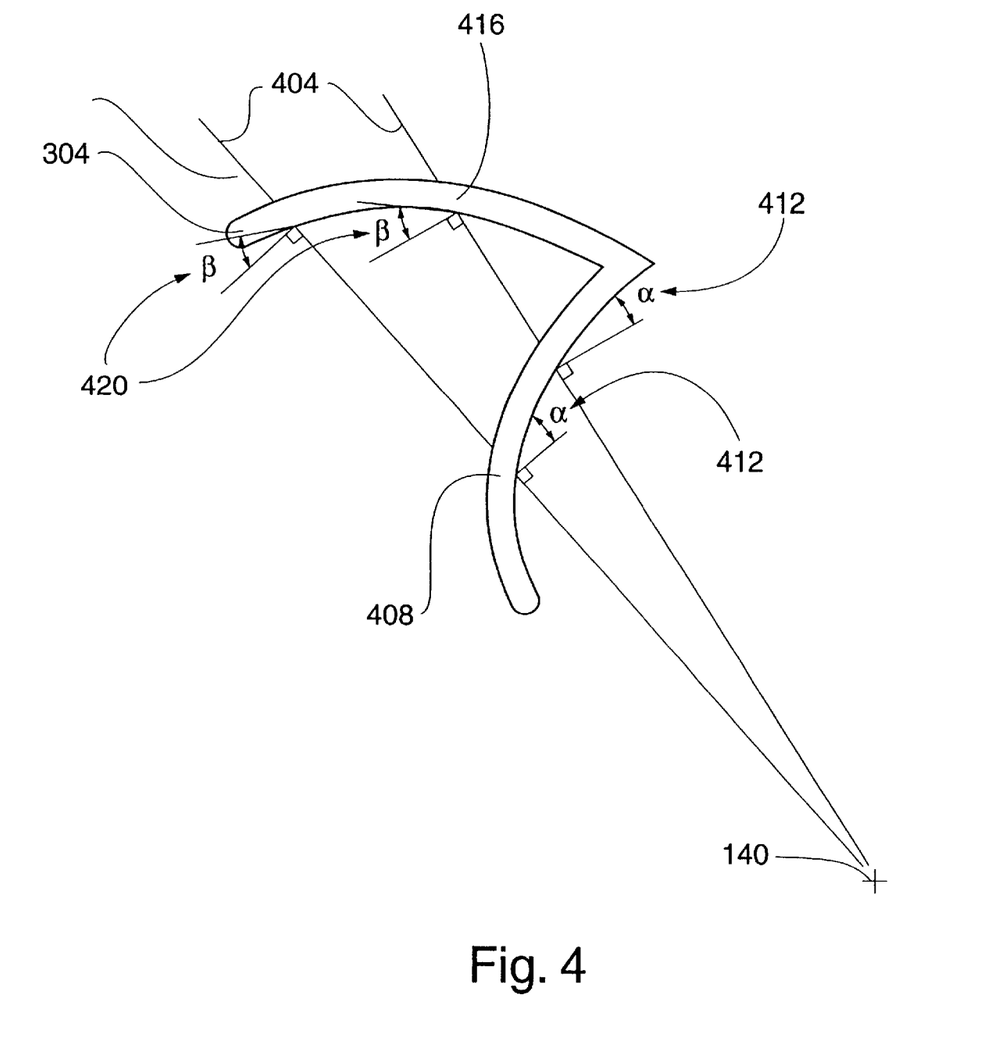
FIG. 4 is a detail illustrating the geometry of an individual groove comprising the grooved surface illustrated in FIG. 3 in accordance with one embodiment of the present invention.

A detail of one of the thrust bearing grooves 304 is shown in FIG. 4. As can be seen from that figure, each thrust bearing groove 304 is generally comprised of two arcuate grooves joined at their ends to form one larger groove generally having an arrow-head shape. Radii 404 of the annular surfaces 192 and 196 of the spindle bearing 128 are shown in FIG. 4 for illustration purposes. The radii 404 emanate from the longitudinal axis 140 (or center line) of the spindle 124. The inner groove portion 408 of the thrust bearing groove 304 can be seen to intersect each radius 404 at an angle α 412. According to the illustrated embodiment, the angle α 412 is equal at any point along inner groove portion 408 through which a radius 404 of the annular surfaces 192 and 196 of the spindle bearing 128 is drawn. The upper groove portion 416 is also shown with radii 404 of the spindle bearing 128 passing through it for illustration purposes. The angle β 420 between the upper groove portion 416 at the radii 404 is, according to the illustrated embodiment of the invention, the same, regardless of the point along upper groove portion 416 that a radius 404 of the annular surfaces 192 and 196 of the spindle bearing 128 is drawn. Furthermore, in a preferred embodiment of the present invention, the angles α 412 and β 420 are equal. Most preferably, the angles α 412 and β 420 are in a range of from about 20° to about 30°.

Although the grooves 204 and 304 or vanes used to draw air to intermediate or inner portions of the bearing surfaces may be positioned on either the spindle bearing 128 or the bearing surfaces of the hub assembly 112 (i.e. the sleeve 148 and the thrust plate 152), they generally should not be placed on both the spindle bearing 128 and the bearing surfaces of the hub assembly 112. If grooves are provided on opposing surfaces, air pressure is not developed properly.

In a preferred embodiment, the length of the spindle bearing 128 is about 8 mm, the diameter of the spindle bearing 128 is about 20 mm, and the inside diameter of the sleeve 148 is about 21.5 mm. The spindle 124 has a diameter of about 5 mm. The radial clearance between the upper annular surface 192 of the spindle bearing 128 and the upper annular surface 172 of the sleeve 148, and between the lower annular surface 196 of the spindle bearing 128 and the thrust plate 152, is about 9.0 μm. The hub 144 extends vertically from the flange 164 for about 12 mm, and has an outer diameter of about 25 mm over that distance to allow the hub to accept a stack of magnetic storage disks. The inside diameter of the hub 144 between about the flange 164 and the clamp 168 has a diameter of about 23.5 mm and defines an upper inner cylindrical volume. The sleeve 148 fitted within this upper inner cylindrical volume has an inside diameter of about 21.5 mm.

Figure 5:
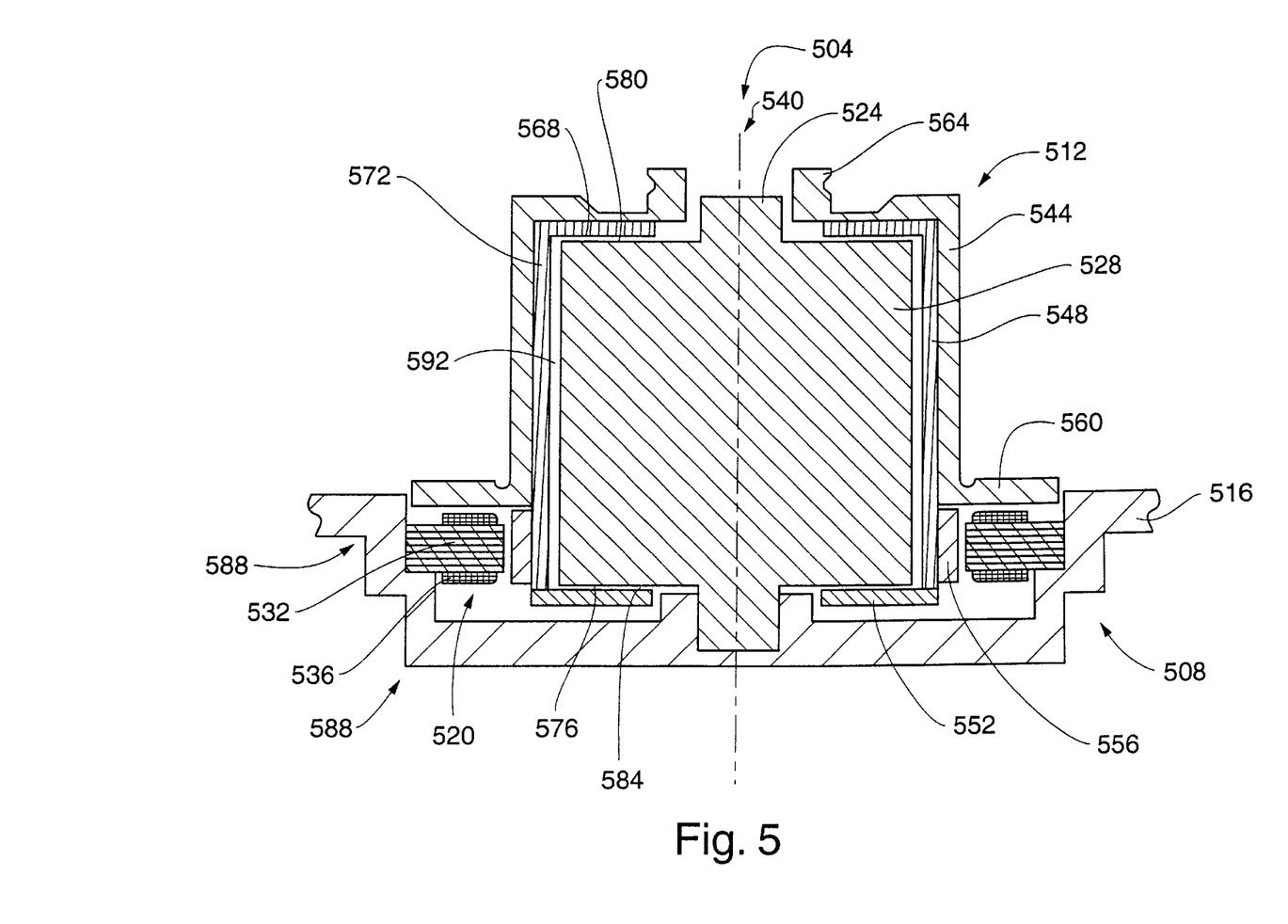
FIG. 5 is a cutaway view of a disk drive spindle air bearing having an inside-out underslung motor in accordance with one embodiment of the present invention.

In FIG. 5, an air bearing having an inside-out underslung motor design constructed in accordance with another embodiment of the present invention is identified as air bearing 504. In general terms, the air bearing 504 differs from the embodiment of the present invention illustrated in FIG. 1 in that the bearing area of air bearing 504 is increased. This is because, for a given height of the hub 544 in FIG. 5, as measured from the clamp 564 to the flange 560, the spindle bearing 528 and the sleeve 548 are about 60% longer than those in the air bearing 104 shown in FIG. 1 having a hub 144 with an equal height, as measured from the clamp 168 to the flange 164. This increased bearing size is the result of the inside-out underslung motor design of the air bearing 504, which offers increased radial bearing stiffness over the embodiment of FIG. 1, while maintaining a compact overall size. Indeed, in a preferred embodiment, for a given disk drive size format, the external dimensions of air bearing 504 are no larger than the external dimensions of air bearing 104.

The air bearing 504 is generally comprised of a base assembly 508 and a hub assembly 512. The base assembly 508 of the present embodiment is similar to the base assembly 108 of the embodiment illustrated in FIG. 1 in that it generally comprises a base 516, only a portion of which is illustrated in FIG. 5, a stator assembly 520, and a spindle 524. The spindle 524 includes an enlarged bearing portion 528.

The stator assembly 520 is comprised of laminations 532 and coils 536. The laminations 532 are affixed to the base 516 and are arranged radially about the longitudinal axis 540 of the spindle 524. Being a part of the base assembly 508, the spindle 524 is affixed to the base portion 516. The coils 536 of the stator assembly 520 are disposed about the laminations 532. In a preferred embodiment, the laminations 532 comprise thin sheets of a ferromagnetic material stacked on top of one another, and the coils 536 comprise an electrically conductive wire having an insulating exterior, wound about the laminations 532. Also in a preferred embodiment, the base 516 comprises cast aluminum, and the spindle 524 comprises machined steel.

The hub assembly 512 comprises the hub 544, sleeve 548, thrust plate 552, and magnets 556. The hub 544 has an internal cavity that is substantially filled by the bearing portion 528 of the spindle 524. The sleeve 548 according to this embodiment of the present invention extends beyond the lower extreme of the hub 544. At the lower extreme of the hub 544 is a flange 560 onto which magnetic storage disks (not shown) may be stacked. The hub 544 also features a clamp 564 to which a retainer (not shown) may be affixed to retain the magnetic disks (not shown).

The internal cavity of the hub 544 is generally cylindrical in shape. Affixed to this internal cavity of the hub 544 is the sleeve 548. The interior of the sleeve 548 has an annular upper surface 568 and a cylindrical side surface 572. The interior of the sleeve 548 is sized such that the inner diameter of the cylindrical side surface 572 is slightly larger than the diameter of the spindle bearing 528. Thrust plate 552 has an annular shape, and is located adjacent to the lower annular surface 576 of the spindle bearing 528. The thrust plate 552 is affixed to the lower portion of the sleeve 548. The cylindrical side surface 572 of the sleeve 548 is slightly longer than the length of the spindle bearing 528. Therefore, when the thrust plate 552 is affixed to the sleeve 548, there is a thin upper annular space 580 and a similarly dimensioned lower annular space 584 between the spindle bearing 528 and the interior bearing surfaces 568, 572 and 552 of the hub assembly 512.

A portion of the cylindrical side surface 572 of the sleeve 548 is adapted to receive a plurality of magnets 556 on its outer circumference. Accordingly, the magnets 556 are located radially about the longitudinal axis of the spindle 540. Furthermore, the magnets 556 are positioned so that they are within a circumference described by the stator assembly 520, and adjacent to the laminations 532 of the stator assembly 520. Therefore, there is no need for a separate back iron component according to this embodiment of the present invention. In addition, the air bearing 504 having an inside-out underslung motor design features greater resistance to radial movement caused by magnetic forces than does the air bearing 104 having an underslung motor of conventional design. This is so because the air bearing 504 has a spindle bearing 528 that extends to at least the center line of the magnets 556 that interact with the stator assembly 520 when the hub assembly 512 is being rotated relative to the base 516.

The motor 588 of this embodiment of the present invention is generally comprised of the laminations 532, the coils 536, and the magnets 556. When the motor 588 is in operation, an electrical current is supplied to the coils 536, which creates a magnetic field about and through the laminations 532. This magnetic force causes the hub assembly 512 to rotate relative to the base 516 through its interaction with the magnetic force of the magnets 556.

The rotation of the hub assembly 512 and the associated sleeve 548 and thrust plate 552, relative to the spindle bearing 528 of the hub assembly 508, creates a flow of air in the upper annular space 580, the lower annular space 584, and the cylindrical space 592 formed between the spindle bearing 528 and the side surface 572 of the sleeve 548. This air flow creates higher air pressures in the spaces between the spindle bearing 528, and the sleeve 548 and thrust plate 552 of the hub assembly 512. This high pressure air then serves to prevent direct contact between the spindle bearing 528 and the bearing surfaces of the hub assembly 512. Because of the greater spindle bearing 528 length of the air bearing 504 having an inside-out underslung motor design, the radial stiffness (i.e. the resistance of the bearing to forces along a radius of the hub 512) of the air bearing 504 assembly is increased. Thus, the embodiment of FIG. 5 offers greater resistance to radial forces, and/or allows lower bearing tolerances while achieving acceptable amounts of bearing stiffness.

In a preferred embodiment, the air bearing 504 has grooves on the upper 580 and lower 576 annular surfaces, and on the cylindrical side surface 572 of the sleeve 548. The general design and arrangement of these grooves may be as discussed above with respect to the air bearing 104 having an underslung motor design. Also, the air bearing 504 may similarly utilize vanes rather than grooves in the bearing surfaces, and the vanes or grooves may be provided on the interior surfaces of the thrust plate 552 and sleeve 548 rather than on the spindle bearing 528.

In a preferred embodiment, the length of the spindle bearing 528 is about 13.5 mm, the diameter of the spindle bearing 528 is about 20 mm, and the inside diameter of the sleeve 548 is about 21.5 mm. The spindle 524 has a diameter of about 5.0 mm. The radial clearance between the lower annular surface 576 and the thrust plate 552, and between the upper annular surface 580 and the upper surface of the sleeve 568 is about 9.0$\mu$m. The upper portion of the hub 544 defines an inner cylindrical volume having a diameter of about 23.5 mm. The sleeve 548 fitted in this inner cylindrical volume has an inside diameter of about 21.5 mm.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A disk storage drive comprising:
   a stationary shaft having a bearing portion and a spindle portion, said bearing portion is concentric to said spindle portion and has a diameter at least about 4 times greater than the diameter of said spindle;
   a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
   an annular thrust plate interconnected to said hub, wherein said thrust plate is concentric to said stationary shaft and adjacent to a bottom of said bearing portion;
   a fluid filled gap between said cylindrical bore and said bearing portion, and between said annular thrust plate and said bearing portion;
   a plurality of magnets interconnected to said hub; and
   a stator assembly for interacting with said magnets, wherein said stator assembly is arranged in a circular fashion to define a circle about said plurality of magnets, wherein said circle is concentric to said gap between said cylindrical bore and said bearing portion, wherein said circle has a diameter greater than said diameter of said bearing portion, and wherein a plane perpendicular to an axis of rotation of said hub that intersects said stator assembly along a line midway between a bottom and a top of said stator assembly also intersects said bearing portion.

2. The disk storage drive of claim 1, wherein said fluid is air.

3. The disk storage drive of claim 1, further comprising a plurality of grooves in said top of said bearing portion.

4. The disk storage drive of claim 1, further comprising:
a plurality of grooves in said bottom of said bearing portion.

5. The disk storage drive of claim 1, further comprising a plurality of grooves on said side portion of said bearing portion.

6. The disk storage drive of claim 1, further comprising a plurality of grooves in said top and said bottom of said bearing.

7. The disk storage drive of claim 6, wherein said grooves are arranged in a herringbone pattern.

8. The disk storage drive of claim 6, wherein said grooves comprise at least one row of chevron-shaped notches.

9. The disk storage drive of claim 6, wherein said grooves are arranged as opposing arrays of diagonal grooves.

10. The disk storage drive of claim 6, wherein said grooves are arranged in a spiral pattern.

11. The disk storage drive of claim 6, wherein said grooves are arcuate.

12. The disk storage drive of claim 6, wherein said grooves draw air away from the edge of said bearing when said hub rotates relative to said bearing.

13. A disk storage drive comprising:
a stationary shaft having a bearing portion and a spindle portion, said bearing portion is concentric to said spindle portion and has a diameter at least about 4 times greater than the diameter of said spindle;
a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
an annular thrust plate interconnected to said hub, wherein said thrust plate is concentric to said stationary shaft and adjacent to a bottom of said bearing portion;
a fluid filled gap between said cylindrical bore and said bearing portion, and between said annular thrust plate and said bearing portion and between said annular thrust plate and said bearing portion; and
a plurality of grooves in said top of said bearing portion, wherein said plurality of grooves comprises inner grooves and outer grooves that intersect to form a V-shaped groove, wherein said top and said bottom of said bearing have a common center axis, and wherein there is a first angle between a first radial line drawn from said center axis and any one inner groove intersected by said first radial line that is equal to a second angle between a second radial line drawn from said center axis and any one inner groove intersected by said second radial line.

14. A disk storage drive comprising:
a stationary shaft having a bearing portion and a spindle portion, said bearing portion is concentric to said spindle portion and has a diameter at least about 4 times greater than the diameter of said spindle;
a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
an annular thrust plate interconnected to said hub, wherein said thrust plate is concentric to said stationary shaft and adjacent to a bottom of said bearing portion; and
a fluid filled gap between said cylindrical bore and said bearing portion, and between said annular thrust plate and said bearing portion and between said annular thrust plate and said bearing portion; and
a plurality of grooves in said top of said bearing portion, wherein said plurality of grooves comprises inner grooves and outer grooves that intersect to form a V-shaped groove, wherein said top and said bottom of said bearing have a common center axis, and wherein there is a first angle between a first radial line drawn from said center axis and any one outer groove intersected by said first radial line that is equal to a second angle between a second radial line drawn from said center axis and any one outer groove intersected by said second radial line.

15. A disk storage drive comprising:
a stationary shaft having a bearing portion and a spindle portion, said bearing portion is concentric to said spindle portion and has a diameter at least about 4 times greater than the diameter of said spindle;
a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
an annular thrust plate interconnected to said hub, wherein said thrust plate is concentric to said stationary shaft and adjacent to a bottom of said bearing portion; and
a fluid filled gap between said cylindrical bore and said bearing portion, and between said annular thrust plate and said bearing portion and between said annular thrust plate and said bearing portion; and
a plurality of grooves in said top of said bearing portion, wherein said grooves have a groove to land ratio of about 1:1.

16. A disk storage drive comprising:
a stationary shaft having a bearing portion and a spindle portion, said bearing portion is concentric to said spindle portion and has a diameter at least about 4 times greater than the diameter of said spindle;
a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
an annular thrust plate interconnected to said hub, wherein said thrust plate is concentric to said stationary shaft and adjacent to a bottom of said bearing portion;
a fluid filled gap between said cylindrical bore and said bearing portion, and between said annular thrust plate and said bearing portion; and
a plurality of grooves in said bottom of said bearing portion, wherein said grooves have a groove to land ratio of about 1:1.

17. A disk storage drive comprising:
a stationary shaft having a bearing portion and a spindle portion, said bearing portion is concentric to said spindle portion and has a diameter at least about 4 times greater than the diameter of said spindle;
a hub having a cylindrical bore concentric to said stationary shaft, wherein a side portion of said cylindrical bore is adjacent to a side portion of said bearing portion, and wherein a top portion of said cylindrical bore is adjacent to a top of said bearing portion;
an annular thrust plate interconnected to said hub, wherein said thrust plate is concentric to said stationary shaft and adjacent to a bottom of said bearing portion;

a fluid filled gap between said cylindrical bore and said bearing portion, and between said annular thrust plate and said bearing portion; and a plurality of grooves on said side portion of said bearing portion, wherein said grooves have a groove to land ratio of about 1:1.

18. The disk storage drive of claim 1, further comprising an underslung motor.

19. The disk storage drive of claim 1, further comprising an inside-out underslung motor.

20. A disk storage drive comprising:

a stationary shaft having a bearing portion, wherein said bearing has a diameter and a length, wherein said length is less than about 90% of said diameter;

a hub having an inner surface that defines a volume;

a sleeve interconnected to said hub and occupying at least a portion of said volume, wherein said sleeve is concentric to said stationary shaft and adjacent to said bearing, and wherein said sleeve has an annular top portion concentric to said stationary shaft and adjacent to a top of said bearing;

an annular thrust plate interconnected to said hub, wherein said thrust plate is concentric to said stationary shaft and adjacent to a bottom of said bearing;

a fluid filled gap between said sleeve and said bearing portion, and between said annular thrust plate and said bearing portion, wherein said bearing portion substantially occupies said volume of said hub;

a plurality of magnets interconnected to said hub, wherein with respect to each of said plurality of magnets a majority of an area of each of said plurality of magnets is substantially perpendicular to a radius of said sleeve and is located between a plane defined by said annular top portion of said sleeve and a plane defined by said annular thrust plate; and a stator assembly for interacting with said magnets.

21. A motor assembly for use in a magnetic disk drive system, comprising:

a base;

a cylindrical bearing interconnected to said base;

a rotatable hub disposed about and concentric to said bearing, wherein said hub has an inner surface defining a cylindrical volume, and wherein said bearing substantially fills said volume;

an annular thrust plate adjacent to a bottom of said bearing, wherein said thrust plate is located at a distance from a top of said cylindrical volume that is slightly larger than a length of said bearing;

a stator having an electromagnetic coil interconnected to said base, wherein said stator is disposed radially about an axis of rotation of said hub; and a magnetic means interconnected to said hub, wherein said magnetic means is disposed radially about said axis of rotation of said hub for interfacing electromagnetically with said coil to rotate said hub relative to said shaft, wherein an area of said magnetic means is substantially located between a plane defined by said annular thrust plate and a plane defined by said top of said cylindrical volume.

22. The motor assembly of claim 21, wherein a cylindrical sleeve member is affixed to said hub and is interposed between said inner surface and said bearing.

23. The motor assembly of claim 22, wherein said sleeve member comprises a ferromagnetic material.

24. The motor assembly of claim 21, wherein said stator defines an inner diameter, and wherein said magnetic means is disposed outside of said inner diameter of said stator.

25. The motor assembly of claim 21, wherein said stator defines an outer diameter, and wherein said magnetic means is disposed within said outer diameter of said stator.

26. An air-bearing motor assembly, comprising:

a base;

a stationary shaft having a cylindrical outer surface, wherein said shaft is affixed to said base;

a stationary annular bearing disposed about said shaft, wherein said bearing has an outer diameter that is at least about 4 times the diameter of said shaft;

a rotatable hub disposed about said shaft;

a sleeve affixed to the inside of said hub and having an annular upper portion and a cylindrical side portion with a diameter that is slightly greater than the diameter of said bearing, wherein a bottom portion of said sleeve extends beyond a bottom portion of said hub;

an annular thrust plate adjacent to a bottom of said sleeve;

a stator affixed to said base; and a magnetic means interconnected to said hub, wherein said magnetic means are substantially positioned between a plane defined by said annular thrust plate and a plane defined by said annular upper portion of said sleeve.

27. The air bearing motor assembly of claim 26, wherein said magnetic means is radially disposed about said stator, wherein said magnetic means and said stator are electromagnetically interconnected to cause a rotation of said magnetic means and said interconnected hub about said stator.

28. The air bearing motor assembly of claim 26, wherein said stator is radially disposed about said magnetic means, wherein said magnetic means and said stator are electromagnetically interconnected to cause a rotation of said magnetic means and said interconnected hub about said stator.

29. A disk storage unit, comprising:

a cylindrical bearing, wherein said bearing has a top, a side, a bottom and a diameter;

a hub having a cylindrical inner surface in a top portion of said hub, wherein said cylindrical inner surface has a diameter that is larger than said diameter of said bearing, wherein a fluid filled gap is formed between said cylindrical inner surface and said top and said side of said bearing, wherein a first volume described by said cylindrical inner surface is substantially equal to a second volume defined by said bearing, and wherein said first volume is substantially equal to a third volume described by an outer surface of said hub;

an annular thrust plate interconnected to said hub, wherein a fluid filled gap is formed between said thrust plate and said bottom of said bearing; and a plurality of magnets interconnected to said hub, wherein each of said magnets has an area substantially perpendicular to a radius of said cylindrical bearing, and wherein at least a majority of said area is located between a plane defined by said top of said cylindrical bearing and a plane defined by said bottom of said cylindrical bearing.

30. A method for rotatably securing a hub to a base, comprising:

providing a base having a spindle attached thereto;

providing said spindle with a bearing;

enveloping said bearing with a hub for carrying magnetic storage disks, wherein said hub has an internal volume described by an interior surface of said hub, and wherein said bearing substantially fills said internal volume of said hub; and providing a plurality of magnets for interacting with a stator assembly, wherein said plurality of magnets are positioned such that a said plurality of magnets and said stator assembly plane perpendicular to an axis of rotation of said hub that intersects with said bearing.

* * * * *

UNITED STATES PATENT AND TRADEMARK OFFICE
CERTIFICATE OF CORRECTION

PATENT NO. : 6,313,967 B1 Page 1 of 1
DATED : November 6, 2001
INVENTOR(S) : Bodmer et al.

It is certified that error appears in the above-identified patent and that said Letters Patent is hereby corrected as shown below:

Column 12,
Lines 1 and 2, please delete the phrase "and between said annular thrust plate and said bearing portion";
Lines 30 and 31, please delete the phrase "and between said annular thrust plate and said bearing portion";

Column 16,
Lines 1 and 2, please delete the phrase "said plurality of magnets and said stator assembly"; and
Line 3, please delete "with" and substitute therefor the phrase -- said plurality of magnets and said stator assembly also intersects --.

Signed and Sealed this

Twelfth Day of November, 2002

*Attest:*

*Attesting Officer*

JAMES E. ROGAN
*Director of the United States Patent and Trademark Office*